United States Patent
Lee et al.

(10) Patent No.: US 8,625,670 B2
(45) Date of Patent: Jan. 7, 2014

(54) METHOD AND APPARATUS FOR ENCODING AND DECODING IMAGE

(75) Inventors: Tammy Lee, Seoul (KR); Jung-hye Min, Yongin-si (KR); Woo-jin Han, Suwon-si (KR); Sang-rae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 12/405,330

(22) Filed: Mar. 17, 2009

(65) Prior Publication Data

US 2009/0232217 A1    Sep. 17, 2009

(30) Foreign Application Priority Data

Mar. 17, 2008    (KR) .................. 10-2008-0024367

(51) Int. Cl.
    *H04N 11/02* (2006.01)
(52) U.S. Cl.
    USPC ............ 375/240.16; 375/240.12; 375/240.13; 375/240.15; 382/236; 382/239; 382/240
(58) Field of Classification Search
    None
    See application file for complete search history.

(56) References Cited

U.S. PATENT DOCUMENTS

| | | | | |
|---|---|---|---|---|
| 7,110,452 B2* | 9/2006 | Katsavounidis et al. | | 375/240.08 |
| 7,126,989 B2* | 10/2006 | Hagai et al. | ............... | 375/240.13 |
| 7,200,275 B2* | 4/2007 | Srinivasan et al. | ............ | 382/239 |
| 7,606,311 B2* | 10/2009 | Hsu et al. | ................. | 375/240.23 |
| 7,852,936 B2* | 12/2010 | Mukerjee et al. | ........ | 375/240.15 |
| 8,462,853 B2* | 6/2013 | Jeon et al. | ................. | 375/240.16 |
| 2005/0053145 A1* | 3/2005 | Hsu et al. | ................. | 375/240.16 |
| 2005/0053293 A1* | 3/2005 | Lin et al. | ....................... | 382/236 |
| 2005/0053294 A1* | 3/2005 | Mukerjee et al. | ............. | 382/236 |
| 2006/0146191 A1* | 7/2006 | Kim et al. | ..................... | 348/557 |
| 2006/0262985 A1* | 11/2006 | Chen et al. | .................... | 382/240 |
| 2009/0232217 A1* | 9/2009 | Lee et al. | ................. | 375/240.16 |

FOREIGN PATENT DOCUMENTS

| | | |
|---|---|---|
| KR | 10-0378795 A | 3/2002 |
| KR | 10-2005-0098243 A | 10/2005 |

OTHER PUBLICATIONS

INSPEC_history_NPL_search.*

* cited by examiner

*Primary Examiner* — William C Vaughn, Jr.
*Assistant Examiner* — Luis M Perez
(74) *Attorney, Agent, or Firm* — Sughrue Mion, PLLC

(57) ABSTRACT

Provided are a method and apparatus for encoding an image, which can variably encode a residual of a current block that is predicted with a skip mode according to prediction modes of neighboring blocks, and a method and apparatus for decoding the encoded image. When both the prediction mode of the current block and the prediction modes of the neighboring blocks are skip modes, since the method of encoding the image also encodes the residual of the current block that is predicted with the skip mode, more bits can be assigned to the current block with a high probability of acting as a reference block for other blocks.

18 Claims, 6 Drawing Sheets

METHOD AND APPARATUS FOR ENCODING AND DECODING IMAGE

CROSS-REFERENCE TO RELATED PATENT APPLICATION

This application claims the benefit of Korean Patent Application No. 10-2008-0024367, filed on Mar. 17, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to encoding an image by determining whether prediction modes of neighboring blocks of a current block that is predicted with a skip mode are skip modes and assigning more bits to a current block with a high probability of acting as a reference block for other subsequent blocks, and to decoding the encoded image.

2. Description of the Related Art

Image compression standards, such as moving picture experts group (MPEG)-1, MPEG-2, MPEG-4, and H.264/MPEG-4 advanced video coding (AVC), divide one picture into macroblocks in order to encode an image. After each of the macroblocks is encoded in all inter-prediction and intra-prediction modes, one of the prediction modes is selected according to a bit rate required to encode each macroblock and a distortion level between each original macroblock and decoded macroblock.

H.264/MPEG-4 AVC roughly divides one picture into one of I, B, and P slices, and divides the slice into a plurality of macroblocks. The macroblocks are encoded in two prediction modes, that is, an inter mode and an intra mode.

An inter mode is a mode used in inter-prediction that encodes macroblocks of a current picture by encoding a difference between a pixel value and information on a motion vector indicating the position of at least one block selected from a reference picture. Since H.264/MPEG-4 AVC has no more than 5 reference pictures, a reference block to which a current macroblock refers is searched for in a frame memory storing reference pictures. The reference pictures stored in the frame memory may precede or follow the current picture.

An intra mode is a mode used in intra-prediction that encodes macroblocks of a current picture by calculating a prediction value of a macroblock to be encoded by using a pixel value of a pixel spatially close to the macroblock to be encoded and encoding a difference between the prediction value and the pixel value.

FIG. 1 illustrates conventional inter-prediction modes for motion estimation and compensation in H.264/MPEG-4 AVC. One 16×16 macroblock may be divided into two 16×8 blocks, two 8×16 blocks, or four 8×8 blocks, and each of the 8×8 blocks may be further divided into two 8×4 blocks, two 4×8 blocks, or four 4×4 blocks. Each of the macroblocks is encoded in the inter-prediction modes, and then a prediction mode incurring the least cost is determined according to a bit rate required to encode each macroblock and a distortion level between each original macroblock and decoded macroblock.

Also, in H.264/MPEG-4 AVC, in addition to the prediction modes shown in FIG. 1, there is a skip mode in which each of a plurality of macroblocks is encoded by using only a 1-bit flag when motion vectors of macroblocks included in a P slice are the same as predictive motion vectors or motion vectors of macroblocks included in a B slice are the same as direct motion vectors. In the skip mode, only the 1-bit flag is included in a bitstream as encoding information of the macroblock, and a residual of the macroblock is not encoded. When the macroblock encoded with the skip mode is decoded, a predictive motion vector is generated from motion vectors of neighboring blocks that have already been encoded, and motion compensation is performed by using the predictive motion vector to reconstruct the macroblock.

In general, a macroblock determined to have a skip mode is often present in a background where less motion occurs. In particular, when there is no scene change and a background is fixed, a probability that areas of subsequent frames corresponding to a background area encoded with a skip mode are encoded with skip modes is high. As such, when a block encoded with a skip mode is used as reference data for other blocks, the quality of the other blocks referring to the block encoded with the skip mode may be reduced as the quality of the block encoded with the skip mode is reduced.

SUMMARY OF THE INVENTION

The present invention provides a method and apparatus for encoding an image, which can improve the quality of other blocks referring to a skip block, which is encoded with a skip mode having a high probability of acting as reference data, by assigning more bits to the skip block, and a method and apparatus for decoding the encoded image.

The present invention also provides a method and apparatus for encoding an image, which can control the number of bits generated when other blocks referring to a skip block, which is used as reference data for the other blocks, are encoded by assigning more bits to the skip block, and a method and apparatus for decoding the encoded image.

According to an aspect of the present invention, there is provided a method of encoding an image, the method comprising: performing motion estimation on a current block to be encoded and determining a prediction mode of the current block; when the determined prediction mode of the current block is a skip mode, determining whether prediction modes of neighboring blocks of the current block are skip modes; when it is determined that the prediction modes of the neighboring blocks are skip modes, encoding a residual that is a difference value between the current block and a prediction block of the current block; and adding the residual to a bit stream that is generated by encoding the image.

According to another aspect of the present invention, there is provided an apparatus for encoding an image, the apparatus comprising: a motion estimation unit which performs motion estimation on a current block to be encoded by using available prediction modes; an encoding unit which encodes a residual that is a difference value between the current block and a prediction block of the current block; and a control unit which determines a prediction mode of the current block from among the prediction modes by using costs of a bitstream generated by the encoding unit, and when it is determined that the determined prediction mode of the current block is a skip mode and prediction modes of neighboring blocks are skip modes, adds the residual to the bitstream generated by the encoding unit.

According to another aspect of the present invention, there is provided a method of decoding an image, the method comprising: extracting a prediction mode of a current block to be decoded from an input bitstream; when the extracted prediction mode of the current block is a skip mode, determining whether prediction modes of neighboring blocks of the current block are skip modes; when it is determined that the prediction modes of the neighboring blocks are skip modes, extracting a residual of the current block from the bitstream and decoding the extracted residual; generating a prediction block of the current block according to the skip mode; and adding the prediction block of the current block and the residual and decoding the current block.

According to another aspect of the present invention, there is provided an apparatus for decoding an image, the apparatus comprising: an entropy decoding unit which extracts a residual and a prediction mode of a current block to be decoded from an input bitstream; a prediction unit which generates a prediction block of the current block according to the extracted prediction mode; a residual reconstruction unit which decodes the residual; a control unit, which, when the extracted prediction mode of the current block is a skip mode and prediction modes of neighboring blocks of the current block are skip modes, extracts a residual of the current block from the bitstream and controls the residual reconstruction unit so that the residual reconstruction unit decodes the residual; and an addition unit which adds the prediction block of the current block and the residual and decoding the current block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
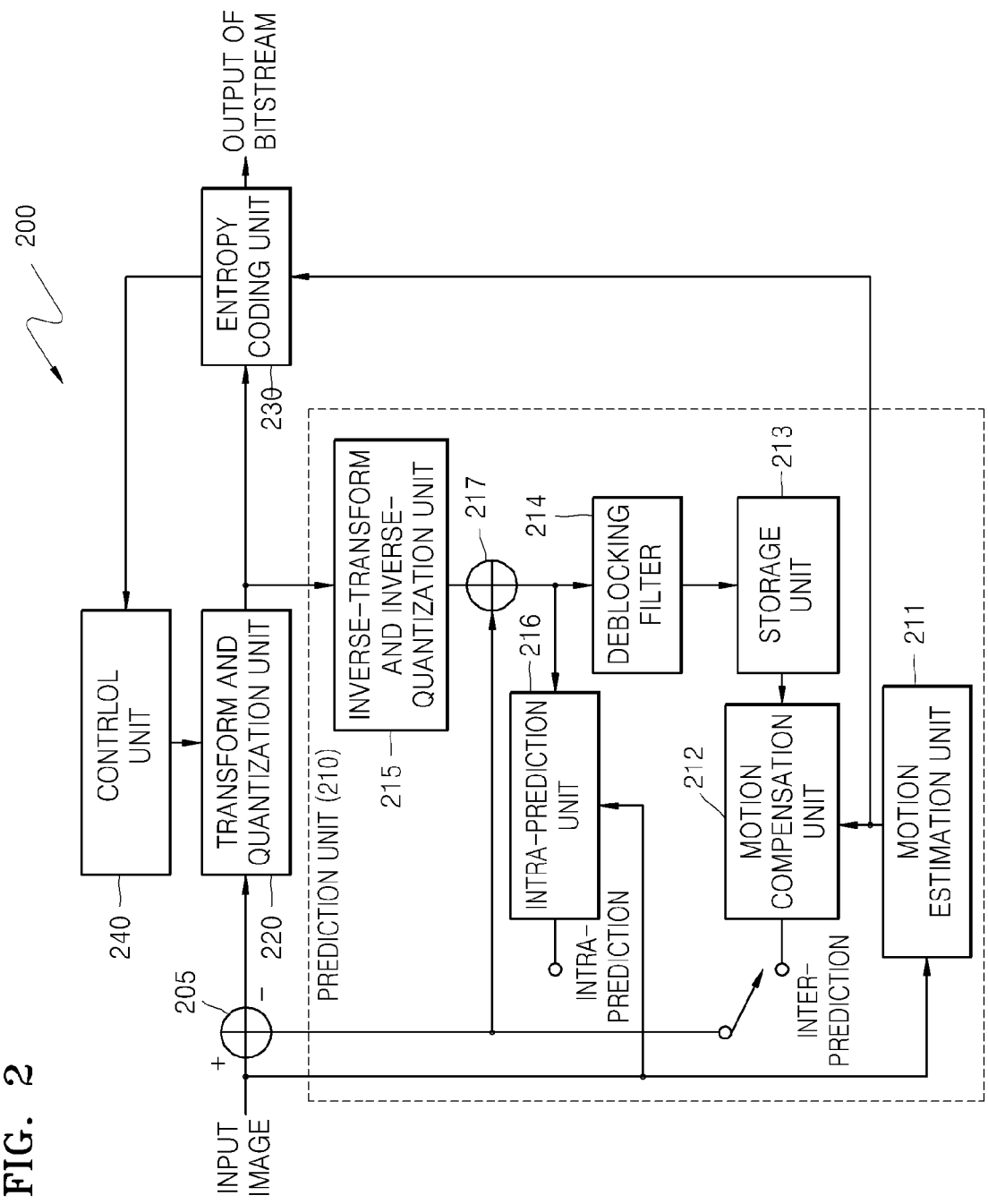
FIG. 2 is a block diagram of an apparatus for encoding an image, according to an exemplary embodiment of the present invention.

FIG. 2 is a block diagram of an apparatus 200 for encoding an image, according to an embodiment of the present invention. Referring to FIG. 2, the apparatus 200 according to the current embodiment includes a subtraction unit 205, a prediction unit 210, a transform and quantization unit 220, an entropy coding unit 230, and a control unit 240. The prediction unit 210 includes a motion compensation unit 212, a storage unit 213, a deblocking filter 214, an inverse-transform and inverse-quantization unit 215, an intra-prediction unit 216, and an addition unit 217.

Figure 1:
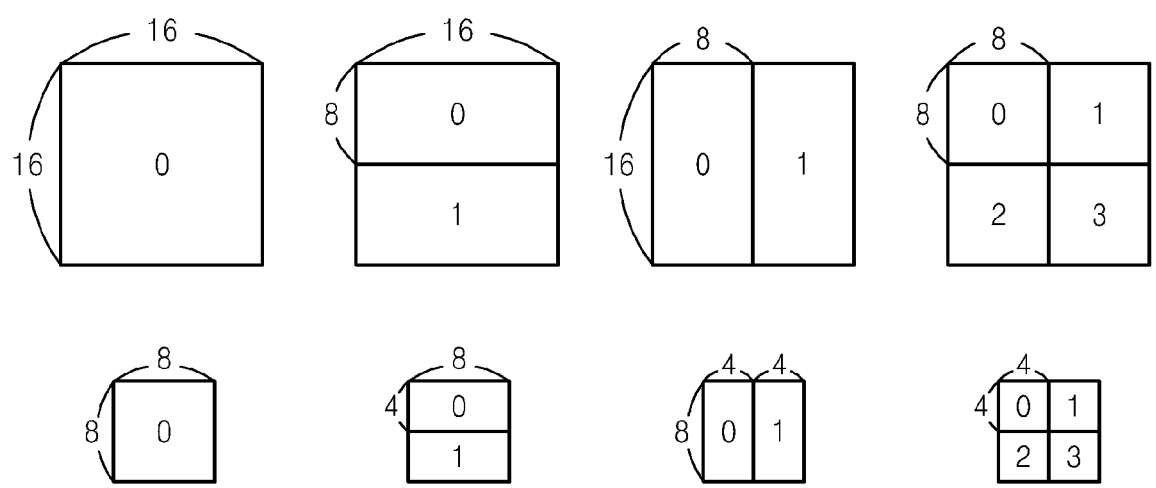
FIG. 1 illustrates conventional inter-prediction modes for motion estimation and compensation in H.264/moving picture experts group (MPEG)-4 advanced video coding (AVC)

The prediction unit 210 divides an input image into blocks of a predetermined size, and generates a prediction block of each of the divided blocks through inter-prediction or intra-prediction. In detail, a motion estimation unit 211 performs motion estimation that generates a motion vector by searching for a region similar to a current block within a predetermined range of a reference picture, which has already been encoded and reconstructed, according to prediction modes as shown in FIG. 1, that is, 16×16, 16×8, 8×16, 8×8, 8×4, 4×8, or 4×4 prediction modes. The motion compensation unit 212 performs motion compensation that acquires data of a corresponding region of the reference picture indicated by the generated motion vector and generates a prediction block of the current block. The intra-prediction unit 216 performs intra-prediction that generates a prediction block by using data of neighboring blocks around the current block.

The subtraction unit 205 generates a residual that is a difference between the generated prediction block of the current block and original image data. The transform and quantization unit 220 transforms the residual into a frequency domain, and quantizes the transformed residual.

The entropy coding unit 230 performs variable length coding on the quantized residual to generate a bitstream.

The inverse-transform and inverse-quantization unit 215 inverse-quantizes and inverse-transforms the transformed and quantized residual to reconstruct the residual. The addition unit 217 adds the reconstructed residual and the prediction block to reconstruct the current block. The reconstructed current block passes through the deblocking filter 214, and is stored in the storage unit 213 to be used as reference data for a next block.

The control unit 240 compares costs of a bitstream according to the prediction modes and a bitstream according to a skip mode, and determines an optimal prediction mode in encoding the current block. Here, a skip mode is a mode that requires encoding of only the prediction mode of the current block. In general, when a current block to be encoded is a background area, a probability that a reference picture to which the current block refers and the current block are the same is high. Accordingly, in this case, only a prediction mode is transmitted through a 1-bit flag without encoding separate data such as a residual or a motion vector. When a decoder decodes the current block that is determined to have a skip mode, the decoder determines a predictive motion vector of the current block by using motion vectors of the neighboring blocks, and uses a motion compensation value obtained by using the predictive motion vector as a decoded value of the current block.

A method of determining a predictive motion vector of a current block in a skip mode will now be explained. Here, the predictive motion vector is not a motion vector that is determined through motion estimation but is a predictive motion vector that is determined by using motion vectors of neighboring blocks of the current block.

Figure 3A:
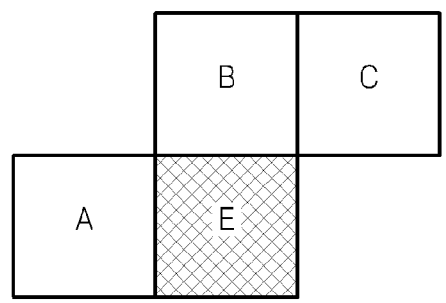
FIGS. 3A and 3B are reference views for explaining a method of determining a predictive motion vector according to a skip mode, according to an exemplary embodiment of the present invention.
Figure 3B:
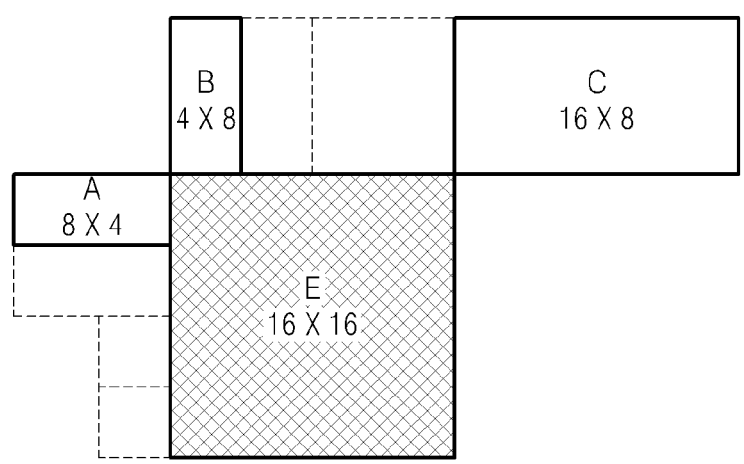

FIGS. 3A and 3B are reference views for explaining a method of determining a predictive motion vector according to a skip mode, according to an embodiment of the present invention. FIG. 3A is a diagram for explaining a method of calculating a predictive motion vector when a current block E and neighboring blocks A, B, and C have the same size. FIG. 3B is a diagram for explaining a method of calculating a predictive motion vector when a current block E and neighboring blocks A, B, and C have different sizes. Referring to FIGS. 3A and 3B, a predictive motion vector MVP of the current block E may be determined as follows.

① The predictive motion vector MVP of the current block E except 16×8 and 8×16 blocks is calculated as a median value among the motion vectors of the neighboring blocks A, B, and C.

② When the current block E comprises two 16×8 blocks, the predictive motion vector MVP of the above 16×8 block of the current block E is predicted from the neighboring block B, and the predictive motion vector MVP of the below 16×8 of the current block E is predicted from the neighboring block A.

③ When the current block E comprises two 8×16 blocks, the predictive motion vector MVP of the left 8×16 block of the current block E is predicted from the neighboring block A, and the predictive motion vector MVP of the right 8×16 block of the current block E is predicted from the neighboring block C.

④ The predictive motion vector MVP of the current block E in the case of a skip block is calculated in the same manner as described in ①.

The method of determining the predictive motion vector is widely known in H.264/MPEG-4 AVC and thus a detailed explanation thereof is not provided here.

The control unit 240 compares a cost of the current block that is encoded by using a virtual predictive motion vector according to a skip mode and costs of the current block that is encoded according to the prediction modes shown in FIG. 1, and determines a prediction mode with the least cost. The costs may be bit rate-distortion (RD) costs, but the present invention is not limited thereto.

When it is determined that the prediction mode of the current block is a skip mode, the control unit 240 determines whether prediction modes of the neighboring blocks of the current block are skip modes in order to more precisely determine whether the current block that is determined to have a skip mode is a real background area. If the prediction modes of the neighboring blocks of the current block are skip modes, it may be determined that a probability that the current block is a real background area is high. When the blocks in the current picture are raster scanned from left to right and from top to bottom, the neighboring blocks may include at least one of an upper block, a left block, and a left-upper block of the current block which have been encoded before the current block. In order to increase the accuracy of determination on whether the current block determined to have a skip mode (referred to as a skip current block hereinafter) is a real background area, it may be determined that the current block belongs to a background area only when all of the upper block, the left block, and the left-upper block of the current block are determined to have skip modes.

When it is determined that the prediction modes of the neighboring blocks of the skip current block are skip modes, the control unit 240 controls the transform and quantization unit 220 and the entropy coding unit 230 so that a residual of the skip current block is encoded. According to the prior art, only a prediction mode of a skip current block determined to have a skip mode is encoded without encoding a residual. However, according to the present invention, a residual of a skip current block whose neighboring blocks are encoded with skip modes is additionally encoded and transmitted, thereby improving prediction efficiency of other blocks referring to the skip current block. In other words, when both the prediction mode of the current block and the prediction modes of the neighboring blocks are skip modes, since a probability that the skip current block is used as a reference block for blocks included in subsequent frames is high, a residual of the skip current block is additionally encoded and transmitted. To this end, when both the prediction mode of the current block and the prediction modes of the neighboring blocks are skip modes, the control unit 240 controls the transform and quantization unit 220 and the entropy coding unit 230 to encode a residual that is a difference between the prediction block of the skip current block generated by using the predictive motion vector and an original current block. The transform and quantization unit 220 transforms the residual of the skip current block into a frequency domain and quantizes the transformed residual according to a control of the control unit 240. The transform and quantization unit 220 may perform quantization by using a quantization parameter less than a preset quantization parameter in order to assign more bits to the skip current block. For example, when a preset quantization parameter used in quantizing the skip current block according to H.264/MPEG-4 AVC is QP, the residual of the skip current block is quantized by using a quantization parameter QP-2 that is obtained by subtracting 2 steps from the quantization parameter QP.

The entropy coding unit 230 adds the residual of the skip current block and a 1-bit flag indicating whether the prediction mode of the current block is a skip mode to the bitstream that is generated by performing the variable length coding on the skip current block whose neighboring blocks are encoded with skip modes.

When it is determined that the prediction modes of the neighboring blocks of the skip current block are not skip modes, the control unit 240 operates so that only a predetermined flag indicating whether the current block is a skip block is added to the bitstream without encoding the residual of the skip current block like in the prior art.

Figure 4:
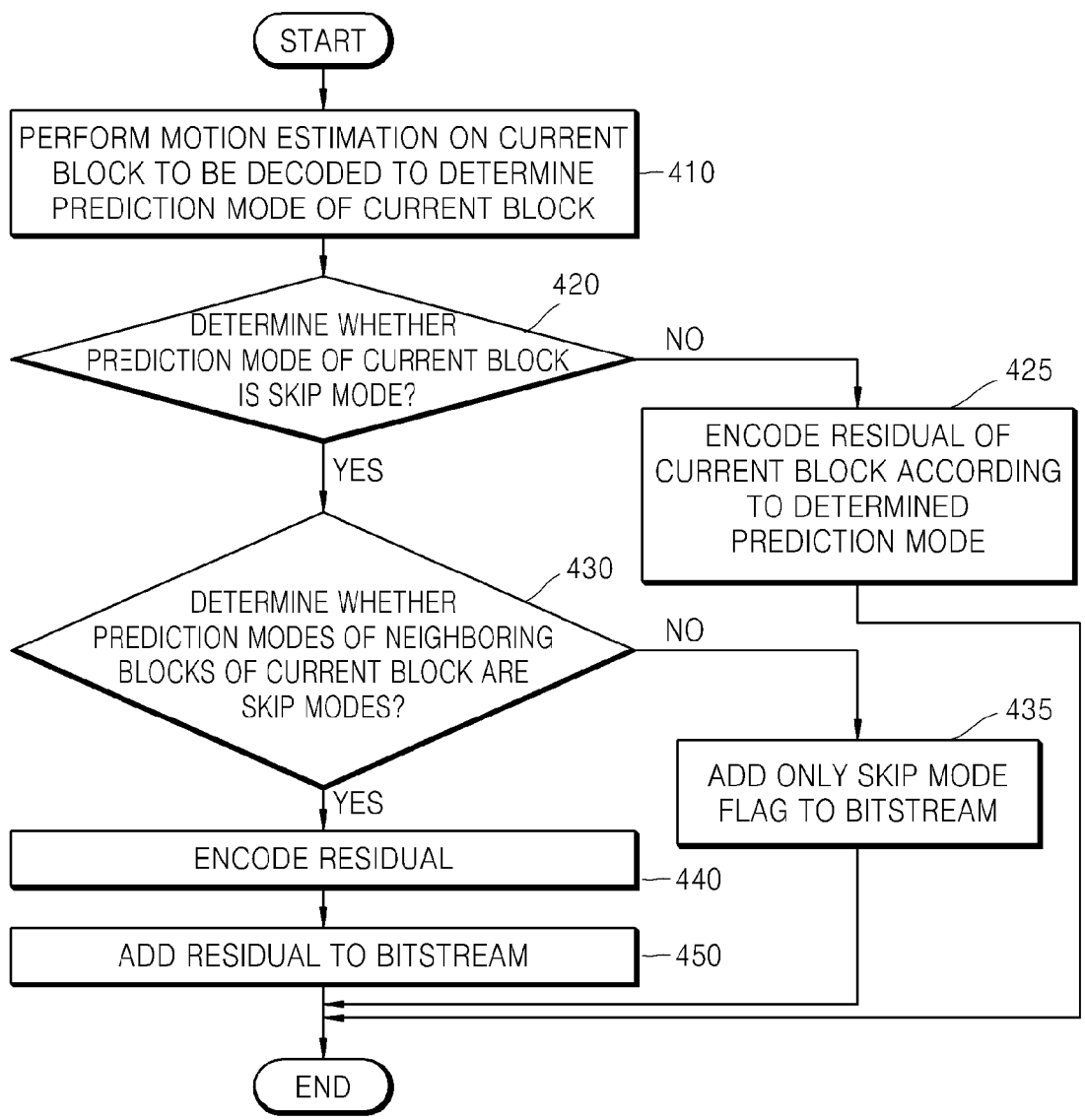
FIG. 4 is a flowchart illustrating a method of encoding an image, according to an exemplary embodiment of the present invention.
Figure 5:
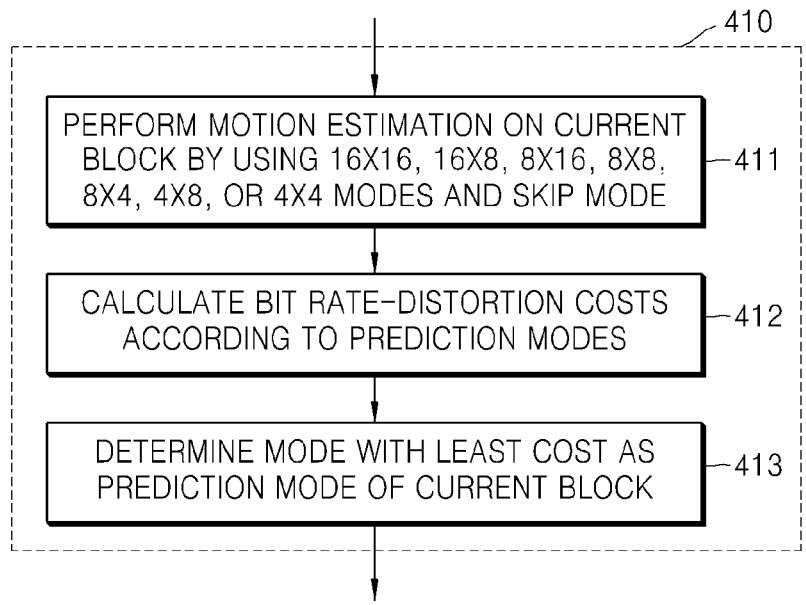
FIG. 5 is a flowchart illustrating operation 410 of the method of FIG. 4, according to an exemplary embodiment of the present invention.

FIG. 4 is a flowchart illustrating a method of encoding an image, according to an embodiment of the present invention. FIG. 5 is a flowchart illustrating operation 410 of the method of FIG. 4, according to an embodiment of the present invention.

Referring to FIG. 4, in operation 410, motion estimation is performed on a current block to be encoded to determine a prediction mode of the current block. Referring to FIG. 5, in operation 411, motion estimation is performed on the current block according to available prediction modes, for example, 16×16, 16×8, 8×16, 8×8, 8×4, 4×8, and 4×4 prediction modes, and a skip mode in order to determine the prediction mode of the current block. In operation 412, costs, for example, RD costs, according to all the prediction modes are calculated. In operation 413, a prediction mode with the least cost is determined as the prediction mode of the current block.

Referring to FIG. 4 again, in operation 420, it is determined whether the prediction mode of the current block is a skip mode. If it is determined in operation 420 that the prediction mode of the current block is a skip mode, the method proceeds to operation 430. In operation 430, it is determined whether prediction modes of neighboring blocks of the current block are skip modes. As described above, the neighboring blocks of the current block may include at least one of an upper block, a left block, and a left-upper block of the current block. In order to increase the accuracy of determination, the number of the neighboring blocks may be increased.

If it is determined in operation 430 that the prediction modes of the neighboring blocks of the skip current block are skip modes, the method proceeds to operation 440. In operation 440, in addition to a 1-bit flag indicating whether the prediction block of the current block is a skip mode, a residual, which is a difference between a motion compensated prediction value of the skip current bock generated by using a predictive motion vector and an input value of the skip current block, is transformed, quantized, and entropy coded to generate a bitstream. At this time, a quantization parameter, which is less than that used to quantize the residual of the skip current block, may be used in order to assign more bits to the skip current block whose neighboring blocks are encoded with skip modes.

In operation 450, the residual of the skip current block generated in operation 440 is added to the bitstream along with the 1-bit flag indicating whether the prediction mode of the current block is a skip mode as encoding information of the skip current block.

If it is determined in operation 420 that the prediction mode of the current block is not a skip mode, the method proceeds to operation 425. In operation 425, the residual of the current block is encoded according to the prediction mode with the least cost to generate a bitstream like in the prior art. If it is determined in operation 430 that the prediction mode of the current block is a skip mode but the prediction modes of the neighboring blocks are not skip modes, the method proceeds to operation 435. In operation 435, only the 1-bit flag indicating whether the prediction block of the skip current block is a skip mode is added as encoding information of the skip current block to the bitstream.

Figure 6:
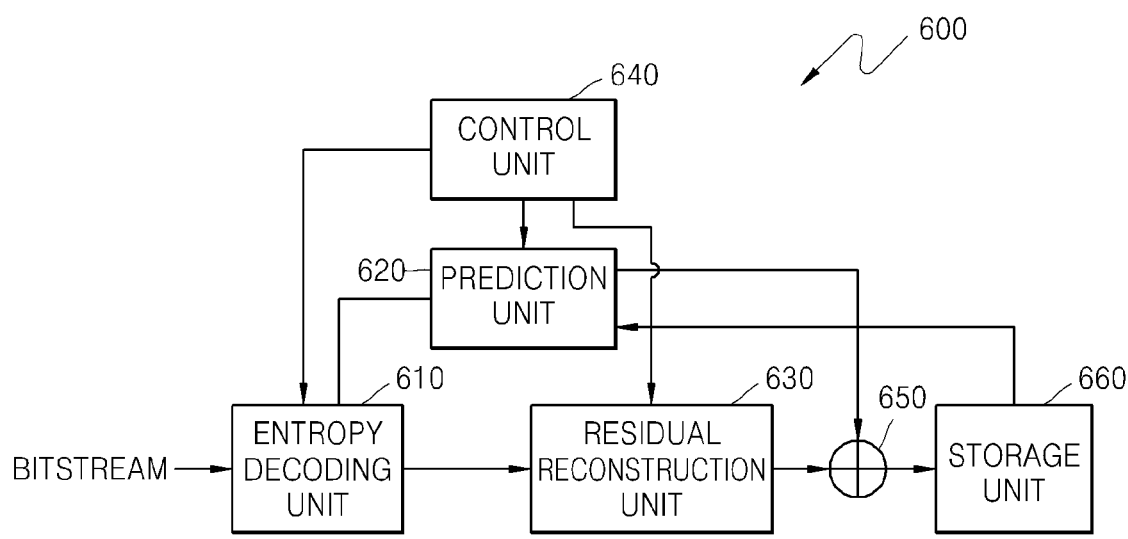
FIG. 6 is a block diagram of an apparatus for decoding an image, according to an exemplary embodiment of the present invention.

FIG. 6 is a block diagram of an apparatus 600 for decoding an image, according to an embodiment of the present invention.

Referring to FIG. 6, the apparatus 600 according to the current embodiment includes an entropy decoding unit 610, a prediction unit 620, a residual reconstruction unit 630, a control unit 640, an addition unit 650, and a storage unit 660.

The entropy decoding unit 610 extracts a prediction mode and a residual of a current block to be decoded from an input bitstream. When the extracted prediction mode of the current block is a skip mode and prediction modes of neighboring blocks which have been decoded before the current block are also skip modes, the control unit 640 controls the entropy decoding unit 610 so that the residual of the current block is extracted from the bitstream. When the extracted prediction mode of the current block is a skip mode but the prediction modes of the neighboring blocks that have been decoded before the current block are not skip modes, since there is no separate residual of the skip current block, the control unit 640 controls the entropy decoding unit 610 so that the residual of the skip current block is not extracted from the bitstream. As such, the control unit 640 of the apparatus 600 can determine types of encoded skip blocks from the prediction mode of the current block and the prediction modes of the neighboring blocks that have been decoded before the current block.

The prediction unit 620 generates a prediction block of the current block according to the extracted prediction mode. If it is determined that the prediction mode of the current block is a skip mode, the prediction unit 620 calculates a predictive motion vector of the skip current block by using motion vectors of the neighboring blocks that have been decoded before the current block, and generates a prediction block of the skip current block by performing motion compensation using the prediction motion vectors.

The residual reconstruction unit 630 inverse-transforms and inverse-quantizes the extracted residual to reconstruct the residual. When the prediction mode of the current block is a skip mode, the control unit 640 determines whether the prediction modes of the neighboring blocks of the skip current block are also skip modes, and when the prediction modes of the neighboring blocks of the skip current block are skip modes, the control unit 640 controls the residual reconstruction unit 630 so that the residual reconstruction unit 630 reconstructs the residual of the skip current block. The neighboring blocks include at least one of an upper block, a left block, and a left-upper block of the current block.

The addition unit 650 adds the prediction block of the current block which is generated according to the prediction mode and the reconstructed residual to decode the current block. When the skip current block whose neighboring blocks have skip modes as prediction modes is decoded, the addition unit 650 adds a motion compensation value generated by using the predictive motion vector and the residual extracted from the bitstream. When the skip current block whose neighboring blocks do not have skip modes as prediction modes is decoded, the addition unit 650 determines a motion compensation value using a predictive motion vector as a decoded value of the skip current block and outputs the motion compensation value like in the prior art.

Figure 7:
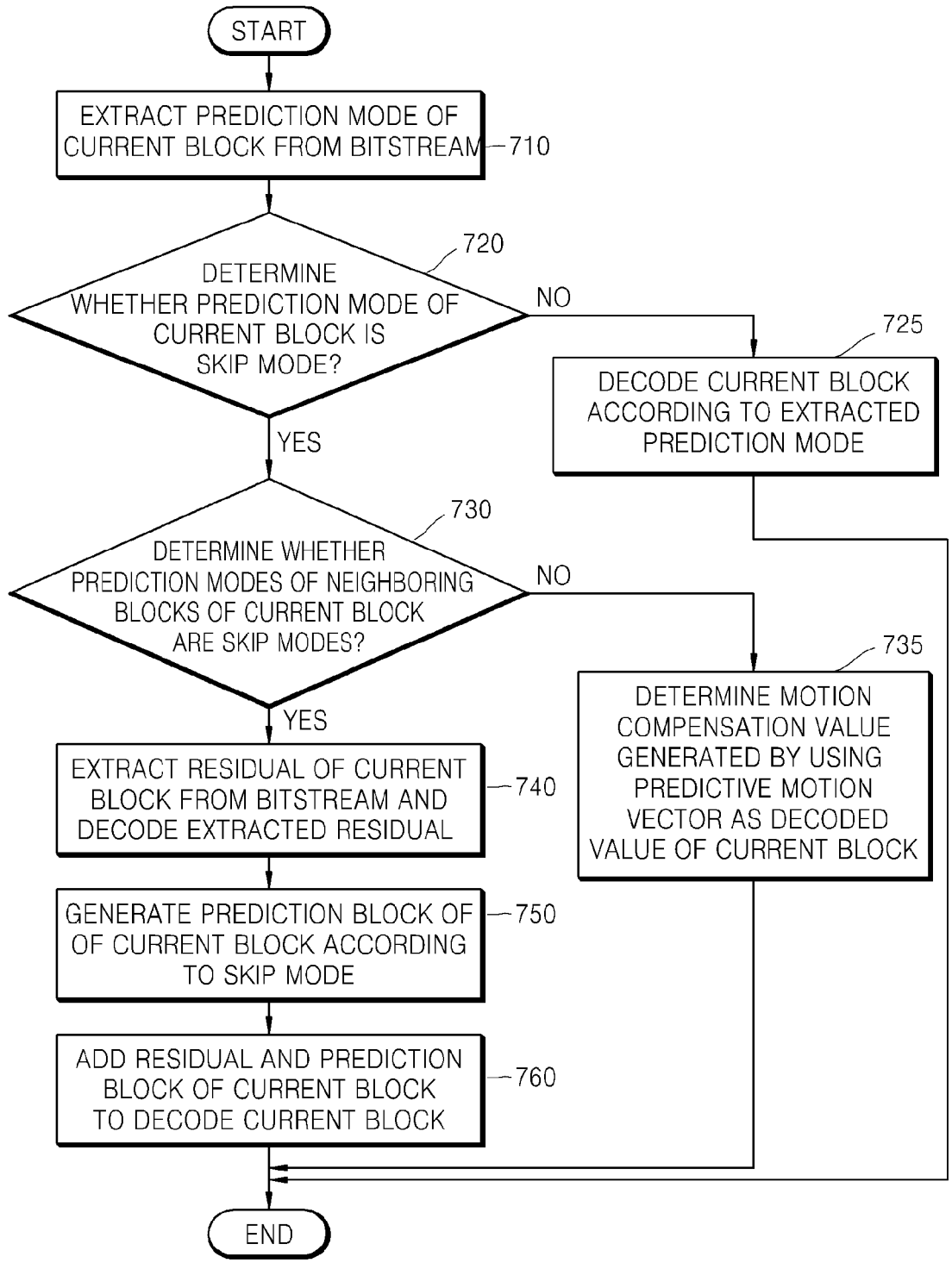
FIG. 7 is a flowchart illustrating a method of decoding an image, according to an exemplary embodiment of the present invention.

FIG. 7 is a flowchart illustrating a method of decoding an image, according to an embodiment of the present invention.

Referring to FIG. 7, in operation 710, a prediction mode of a current block to be decoded is extracted from an input bitstream.

In operation 720, it is determined whether the extracted prediction mode of the current block is a skip mode. If it is determined in operation 720 that the prediction mode of the current block is a skip mode, the method proceeds to operation 730. In operation 730, it is determined whether prediction modes of neighboring blocks of the current block are skip modes.

If it is determined in operation 730 that the prediction modes of the neighboring blocks of the current block are skip modes, the method proceeds to operation 740. In operation 740, a residual of the current block is extracted from the bitstream and is decoded.

In operation 750, a predictive motion vector according to a skip mode is calculated, and motion compensation is performed by using the predictive motion vector to generate a prediction block of the current block.

In operation 760, the prediction block of the current block and the decoded residual are added to decode the current block.

If it is determined in operation 720 that the prediction mode of the current block is not a skip mode, the method proceeds to operation 725. In operation 725, intra-prediction or inter-prediction is performed according to the extracted prediction mode to generate a prediction block of the current block, and the residual extracted from the bitstream and then decoded and the prediction block are added to decode the current block.

If it is determined in operation 730 that the prediction modes of the neighboring block are not skip modes, the method proceeds to operation 735. In operation 735, a motion compensation value itself generated by using the predictive motion vector according to the skip mode is calculated as a decoded value of the current block without decoding the residual like in the prior art.

As described above, according to the present invention, the quality of other blocks referring to a skip block having a high probability of serving as reference data can be improved, and thus a peak signal to noise ratio (PSNR) of an image can be improved.

Moreover, the number of bits generated when the other blocks referring to the skip block are encoded can be adjusted, and thus efficient bit assignment within a limited bandwidth can be performed.

While the present invention has been particularly shown and described with reference to exemplary embodiments thereof, it will be understood by one of ordinary skill in the art that various changes in form and details may be made therein without departing from the spirit and scope of the present invention as defined by the following claims. The present invention may be embodied as computer-readable codes on a computer-readable recording medium. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can also be distributed over network coupled computer systems so that the computer readable code is stored and executed in a distributed fashion.

The present invention may also be embodied as computer-readable codes on a computer-readable transmission medium. The computer-readable transmission medium may be, for example, carrier waves (such as data transmission through the Internet).

What is claimed is:

1. A method of encoding an image, the method comprising:
   performing motion estimation on a current block to be encoded and determining a prediction mode of the current block;
   when the determined prediction mode of the current block is a skip mode, determining whether prediction modes of neighboring blocks of the current block are skip modes;
   when it is determined that the prediction modes of the neighboring blocks of the current block are skip modes, encoding a residual that is a difference value between the current block and a prediction block of the current block; and
   adding the residual of the current block and a mode information indicating that the prediction mode of the current block is the skip mode to a bit stream when the prediction mode of the current block is a skip mode and the prediction modes of the neighbor blocks of the current block are skip modes, and
   adding only the mode information indicating that the prediction mode of the current block is the skip mode to the bit stream when the prediction mode of the current block is the skip mode and the prediction modes of the neighbor blocks of the current block are not skip modes.

2. The method of claim 1, wherein the neighboring blocks comprise at least one of an upper block, a left block, and a left-upper block of the current block.

3. The method of claim 1, wherein the determining of the prediction mode of the current block comprises:
   performing motion estimation on the current block by using all available prediction modes and calculating costs; and
   determining a prediction mode with a least cost from among the prediction modes as a prediction mode of the current block.

4. The method of claim 1, wherein the encoding of the residual further comprises:
   transforming the residual into a frequency domain;
   when the prediction modes of the neighboring blocks of the current block are skip modes,
   quantizing the residual by using a quantization parameter less than a preset quantization parameter; and
   entropy coding the quantized residual.

5. The method of claim 1, when it is determined that the prediction modes of the neighboring blocks are not skip modes, further comprising adding only a predetermined flag, which indicates whether the current block is a skip block, to the bitstream without encoding the residual.

6. An apparatus for encoding an image, the apparatus comprising:
   a motion estimation unit which performs motion estimation on a current block to be encoded by using available prediction modes;
   an encoding unit which encodes a residual that is a difference value between the current block and a prediction block of the current block; and
   a control unit which determines a prediction mode of the current block from among the prediction modes by using costs of a bitstream generated by the encoding unit, and when it is determined that the determined prediction mode of the current block is a skip mode and prediction modes of neighboring blocks are skip modes,
   adds the residual of the current block and a mode information indicating that the prediction mode of the current block is the skip mode to the bitstream generated by the encoding unit and
   adds only the mode information indicating that the prediction mode of the current block is the skip mode to the bit stream when the prediction mode of the current block is the skip mode and the prediction modes of the neighbor blocks of the current block are not the skip modes,
   wherein the skip mode is a prediction mode that uses a motion compensated prediction value, which is generated by using a predictive motion vector of the current block which is predicted by using motion vectors of the neighboring blocks of the current block, as a prediction block of the current block.

7. The apparatus of claim 6, wherein the neighboring blocks comprise at least one of an upper block, a left block, and a left-upper block of the current block.

8. The apparatus of claim 6, wherein the control unit compares the costs of the bit stream generated by performing motion estimation on the current block according to all the available prediction modes and determines a prediction mode with a least cost as a prediction mode of the current block.

9. The apparatus of claim 6, wherein the encoding unit comprises:
   a transform and quantization unit which transforms the residual into a frequency domain, and
   when the prediction modes of the neighboring blocks of the current block are skip modes, which quantizes the residual by using a quantization parameter less than a preset quantization parameter; and
   an entropy coding unit which entropy codes the quantized residual.

10. The apparatus of claim 6, wherein, when it is determined that the prediction modes of the neighboring blocks are not skip modes, the control unit controls the encoding unit so that only a predetermined flag indicating whether the current block is a skip block is added to the bitstream without encoding the residual that is a difference value between the current block and the prediction block of the current block.

11. A method of decoding an image, the method comprising:
   extracting a prediction mode of a current block to be decoded from an input bitstream;
   when the extracted prediction mode of the current block is a skip mode, determining whether prediction modes of neighboring blocks of the current block are skip modes;
   when it is determined that the extracted prediction mode of the current block is a skip mode and the prediction modes of the neighboring blocks of the current block are skip modes,
   extracting a residual of the current block whose prediction mode is a skip mode from the bitstream and decoding the extracted residual;

generating a prediction block of the current block according to the skip mode; and adding the prediction block of the current block and the residual and decoding the current block;

wherein the skip mode is a prediction mode that uses a motion compensated prediction value, which is generated by using a predictive motion vector of the current block which is predicted by using motion vectors of the neighboring blocks of the current block, as a prediction block of the current block.

12. The method of claim 11, wherein the neighboring blocks comprise at least one of an upper block, a left block, and a left-upper block of the current block.

13. The method of claim 11, wherein the generating of the prediction block of the current block according to the skip mode comprises:

generating a predictive motion vector of the current block by using motion vectors of the neighboring blocks of the current block; and determining a motion compensated prediction value by using the generated predictive motion vector as a prediction block of the current block.

14. The method of claim 11, when it is determined that the prediction modes of the neighboring blocks are not skip modes, further comprising:

generating a predictive motion vector of the current block by using motion vectors of the neighboring blocks of the current block; and determining a motion compensated prediction value, which is generated by using the generated predictive motion vector, as a decoded value of the current block.

15. An apparatus for decoding an image, the apparatus comprising:

an entropy decoding unit which extracts a residual and a prediction mode of a current block to be decoded from an input bitstream;

a prediction unit which generates a prediction block of the current block according to the extracted prediction mode;

a residual reconstruction unit which decodes the residual;

a control unit, which, when the extracted prediction mode of the current block is a skip mode and prediction modes of neighboring blocks of the current block are skip modes, extracts a residual of the current block from the bitstream and controls the residual reconstruction unit so that the residual reconstruction unit decodes the residual; and an addition unit which adds the prediction block of the current block and the residual and decodes the current block, wherein the skip mode is a prediction mode that uses a motion compensated prediction value, which is generated by using a predictive motion vector of the current block which is predicted by using motion vectors of the neighboring blocks of the current block, as a prediction block of the current block.

16. The apparatus of claim 15, wherein the neighboring blocks comprise at least one of an upper block, a left block, and a left-upper block of the current block.

17. The apparatus of claim 15, wherein, when the extracted prediction mode of the current block is a skip mode, the prediction unit determines a motion compensated prediction value, which is generated by using a predictive motion vector which is generated by using motion vectors of the neighboring blocks of the current block, as a prediction block of the current block.

18. The apparatus of claim 15, wherein, when it is determined that the prediction modes of the neighboring blocks are not skip modes, the control unit determines a motion compensated prediction value of the current block, which is generated by the prediction unit, as a decoded value of the current block without extracting the residual of the current block from the bitstream.

* * * * *